Oct. 18, 1966  H. E. GOLDBERG  3,279,309
TEMPERATURE COMPENSATION MEANS FOR REFRACTOMETERS
Filed June 21, 1965

INVENTOR.
HERBERT E. GOLDBERG
BY Stanley J. Yarmer
ATTORNEY

United States Patent Office 3,279,309
Patented Oct. 18, 1966

3,279,309
TEMPERATURE COMPENSATION MEANS FOR REFRACTOMETERS
Herbert E. Goldberg, Keene, N.H., assignor to American Optical Company, Southbridge, Mass., a voluntary association of Massachusetts
Filed June 21, 1965, Ser. No. 465,599
3 Claims. (Cl. 88—14)

This invention is a continuation-in-part of my copending patent application, Serial No. 90,499, filed February 20, 1961. It relates to refractometers and similar measuring instruments, particularly the type which is used in laboratory work and in industry for the purpose of measuring or controlling the composition or concentration of liquid substances or solutions.

Such instruments are often based on the measurement of the so-called critical angle of total reflection, in which the position of a boundary line dividing a field of view into a bright and a dark portion is observed against a fixed scale or mark. In other cases, particularly in continuously reading instruments, the spectrometer type of refractometer is used. The invention will be described mainly as it is used in the total reflection type of instrument, but it should be understood that it can be used in connection with either type.

Although the physical quantity actually measured by refractometers is the refractive index of the substance under test, it is often convenient to calibrate the scales or controls of the instrument in units which are of more immediate practical value to the user such as, for instance, percent of suger, specific weight, iodine number, etc., the calibration being based on standard tables then showing the relationship between refractive index and the quantity desired.

Because the thermal expansion of all liquids is substantial, their actual index of refraction, and thus the result of the measurement, change with temperature, and hence such scale calibrations are valid only over narrow ranges of temperature. For instance, it has been found that a refractometer scale which has been calibrated to read a 10 percent sugar solution correctly at 68° F. will read the same solution as 9.5 percent if the temperature rises to 78° F. Since a change of concentration of as little as 1/10 percent is often economically significant in the process industries, it is obvious that the temperature of the sample used for the measurement must be known within one degree F. or so, and that corrections must be applied to the refractometer reading whenever the temperature deviates from normal by that amount.

So-called differential refractometers have been designed where the index of the product under test is compared to that of a standard sample of the same or a similar material, both being held at the same temperature. The error is eliminated by this procedure, but the use of the instrument is restricted to a narrow range of products.

It has also been proposed to correct the temperature error of a refractometer reading mechanically, for instance, by moving the refractometer scale either manually or by some temperature-responsive element.

Manual adjustment would require an exact knowledge of the temperature of the sample to be measured, and would be subject to errors in the reading of this temperature, and in the setting of the compensation adjustment. If compensation were to be carried out automatically, it would be essential to maintain accurately a temperature equilibrium between the sample to be measured and the temperature-responsive element inside the instrument. Furthermore, the scale movement required for a certain temperature change is not the same at all points of the scale. Thus, it can be seen that except for specialized instruments covering very limited ranges of refractive index, complex mechanisms must be relied upon to produce different displacement at the various positions of the scale. These have proved unreliable in practical use and have not been accepted by the industry.

It is thus an object of the present invention to provide simple and reliable means to render the readings of a refractometer substantially independent of temperature over all ranges of temperature and refractive index normally encountered in laboratory or industrial use.

It is another object of the invention to provide structures and arrangements of parts which will assure satisfactory performance of the device under severe operating conditions and without need for maintenance or adjustment.

Other objects of the invention, the principle of the invention, and several embodiments thereof have been described in the following specification and drawings in which.

Figure 1:
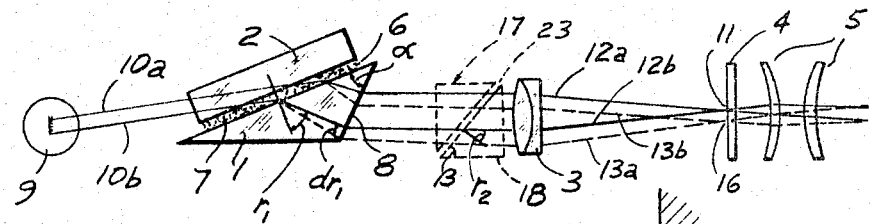
FIGURE 1 is a schematic cross-sectional view of the optical system of a hand refractometer illustrating the invention.

A hand refractometer of the critical angle type is shown in FIGURE 1. The optical system of the instrument is comprised principally of a main refractometer prism 1, a transparent cover 2, an objective lens 3, a reticle such as a scale 4, and an eye piece 5. A casing, various mounts, spacers, and retainers are used to position the optical elements so as to assure proper alignment, calibration, and operation, but since they are similar to those presently used in commercial instruments, they are not shown in the drawing. A layer of a substance 6 whose index is to be measured is spread onto the surface 7 of prism 1 and covered with a light transmitting cover 2. It is illuminated by a light source 9 which may or may not be part of the refractometer proper.

Collimated bundles of light rays 10a, 10b pass through the cover 2 and the substance 6. After having been refracted at an interface 7, and at a color correcting face 8, they are focused by objective lens 3 onto the scale 4, where they form the well-known refractometer boundary line, the position of which may be observed through the eye piece 5.

The light rays 12a, 12b illustrate the path traveled by one such bundle of rays at a temperature $t$. A refractometer reading of 11 is indicated for this temperature. If the temperature $t$ is now assumed to increase by $dt$, the index of refraction $n_s$ of the substance 6 will decrease by $dn_s$, about .0001 to .0002 per degree C., depending on the particular substance. The index $n_g$ of the main glass prism 1, however, remains practically constant because the thermal coefficient of index for glass is only $10^{-5}$ per degree C., some ten or twenty times smaller than $dn_s/dt$. It is seen, therefore, that at the higher temperature the difference of the refractive index between sample and glass has increased in absolute terms, and that the angle of refraction $r_1$ (FIGURE 1) must decrease by $dr_1$. The position of the refracted beam will thus shift from 12a, 12b to 13a, 13b, and the refractometer reading on the scale 4 will be changed from 11 to 16. The change of angle $dr_1$ is:

$$dr_1 = dn_s/n_g \cos r_1 \qquad (1)$$

It is inversely proportional to $\cos r_1$, which, of course, depends on the index of refraction $n_s$ of the sample itself.

This is one reason why the temperature error in a refractometer is not the same at all points of the scale.

The temperature compensator 17, 18 is designed to neutralize the effect just described. It is composed of a glass prism 17 and a second prism 18, cut of a material whose index of refraction $n_p$ varies substantially with temperature. Cyclohexylmethacrylate (CHM) is a suitable substance. Its temperature coefficient is approximately $dn_p/dt = -.00015/$degree C.

If the glass prism is chosen so that its index of refraction is equal to that of CHM at 20° C., for instance, a bundle of light rays 12a, 12b will pass through the compensator without deviation at that temperature, the angle of refraction at interface 23 being $r_2$. At higher temperatures, the bundle will be refracted at the interface 23 into a direction corresponding to an increased angle of refraction $r_2$. The change is given by:

$$dr_2 = -\tan r_2 \frac{dn_p}{n_p} \quad (2)$$

It is seen that $dr_2$ is positive for a decrease of $n_p$ ($dn_p$ being negative), whereas it was shown above that $dr_1$ was negative for a decrease of $n_s$. It is thus possible to compensator 17, 18 between prism 1 and objective lens 3 fractometer shown in FIGURE 1 by inserting the compensator 17 18 between prism 1 and objective lens 3 as shown in FIGURE 1, dotted outline, or between the objective lens 3 and the scale 4. Equation 2 shows that the compensating effect depends on $dn_p/n_p$ which is related to the temperature coefficient of refractive index of the material used, and on the angle of refraction $r_2$ which depends on the nature of the main prism, the angle $\beta$, and the indices of the prisms making up the compensator, as well as on the index $n_s$, of the material to be measured, and on the temperature.

Assuming that two substances $s_1$ and $s_2$ are to be measured with the refractometer and that the temperature coefficients of the respective angles of refraction $r_1$ are $(dr_2/dt)_1$ and $(dr_1/dt)_2$, and that $(dr_1/dt)_2$ is larger in absolute terms than $(dr_1/dt)_1$, perfect temperature compensation can be achieved for both substances if the above-mentioned parameters are so adjusted that the temperature coefficient of the angle of deviation $dr_2/dt$ is similarly larger for $s_2$ than for $s_1$ in absolute terms. If, on the other hand, one is concerned with a special narrow range instrument which must operate over an unusually wide temperature span, $dr_1/dt$ may change substantially with temperature. In this case, the parameters may be selected so that $dr_2/dt$ will also vary substantially with temperature so that the reading on scale 4 will be the same at two different temperatures separated, for example, by a span of 5° C. at least.

Figure 2:
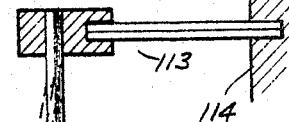
FIGURE 2 is a schematic cross-sectional view of the optical system of a hand refractometer illustrating an alternate way of practicing the invention.
Figure 2:
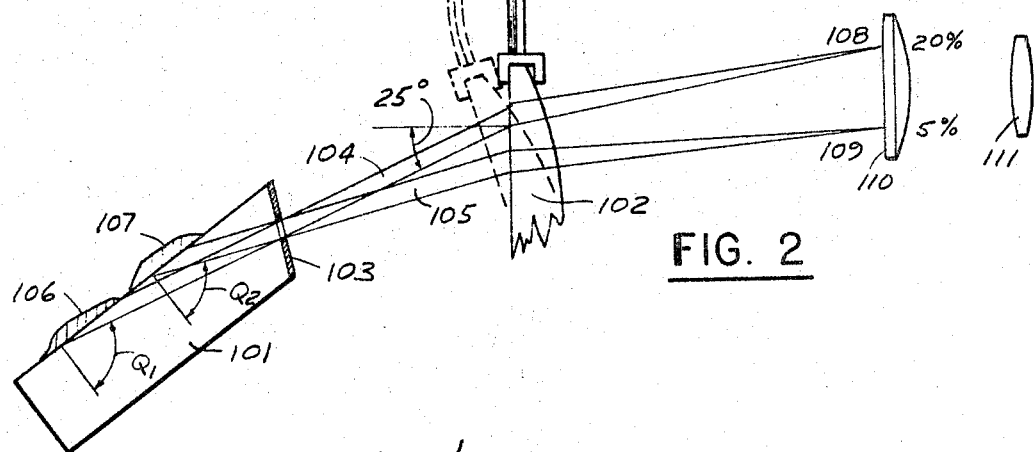

Turning now to FIGURE 2, let it be assumed that the areas 106, 107 of the measuring prism 101 are covered with sucrose solutions, for instance of 25% and 5% strength respectively. The light bundles 104, 105 are shown after refraction to the so-called critical angles of total reflection and focused by an objective lens 102 to image points 108, 109 located on a refractometer scale 110 as shown. The position of the image points on the scale may be observed through an eye lens 111. In practice, only one solution will usually be present at one time, but if the two solutions were present simultaneously, boundary lines would be visible at both the 5% and 25% marks of the scale. The shadows would be of lower than usual contrast, but would be visible nevertheless. For the purpose of the following discussion, the term "optical image" will mean a pattern consisting of two or more boundary lines, formed by the objective lens if several substances are present on the measuring prism, either simultaneously or successively. If the temperature of the sucrose solutions on areas 106, 107 increases, their respective refractive indices will decrease, angles of refraction $Q_1$, $Q_2$ will decrease correspondingly, and light beams 104 and 105 will rotate clockwise, generally at different rates, depending on the refractive indices of the solutions and their temperature coefficients. Disregarding for the moment the elements 112, 113, and 114, image points 108, 109 will move lower on scale 110—at different rates, and the optical image formed on the scale will change size. In order to return the image points to their original positions, they must, therefore, be moved by different distances—the optical image must be moved and its original size must be restored, for instance, by inserting a compensator similar to the one described above in connection with FIGURE 1 into the light path of FIGURE 2 as described so far. It may, therefore, be said that the compensator described in connection with FIGURE 1 functions by moving the image and by changing magnification, although, being a prismatic device, it operates in the tangential image only. This, however, is satisfactory in refractometry.

Another way of changing magnification with temperature is provided by parts 112, 113, 114 of FIGURE 2. It makes use of the well-known relationship between optical distortion and field angle.

Optical distortion occurs whenever the chief ray of a bundle of light (A in FIGURE 3b) passes through an outer zone of an insufficiently corrected lens, particularly a single lens, rather than through its optical center. Optical distortion is an aberration different from all others. Unlike chromatic or spherical aberration, astigmatism or coma, it does not cause a loss of focus and does not blur or degrade the image. Rather, it produces displacement of the tangential image points in a radial direction, either towards the optical axis, or away from it, depending on the paths of the chief rays which is controlled by the position of the aperture stop in relation to the lens.

Distortion does not depend on the size of the aperture stop and would not change, even if the stop were narrowed to a pinhole and each light bundle were reduced to a single ray. Hence, distortion is not associated with the focusing properties of the lens, but is a function of its prismatic properties which act in the meridional plane.

If $d_o$ and $d'_o$ are the directional angles, before and after refraction of a chief ray passing near the center of the lens, the paraxial magnification $m_o$ may be defined by:

$$m_o = \tan d'_o / \tan d_o$$

If $m_1, m_2, \ldots m_n$ are similar, but marginal magnification ratios associated with other chief rays $A_1, A_2, \ldots A_n$ refracted by the outer zones of the lens, the optical distortion suffered by a chief ray $A_n$ is defined as $$D_n = (m_n - m_o)/m_o$$

Well-known optical theory shows that $D_n$ increases with the third power of tan $d_n$ and is negative if the aperture stop is positioned in front of a convergent lens. If tan $d'_n/\tan d_n$ were constant for all angles $d_n$, then $(m_n - m_o) = 0$, and $D_n = 0$. There would be no distortion.

Distortion, therefore, may be described as a change of magnification caused by refraction of the chief rays in the meridional plane according to a non-linear relationship—Snell's law. The amount of distortion associated with a particular chief ray thus depends on the refractive index of the lens, the prism angle prevailing in the meridional plane at the point of incidence and, most of all, on the angle of incidence which is controlled by the orientation of the lens with respect to the incident light beams.

Figure 3A:
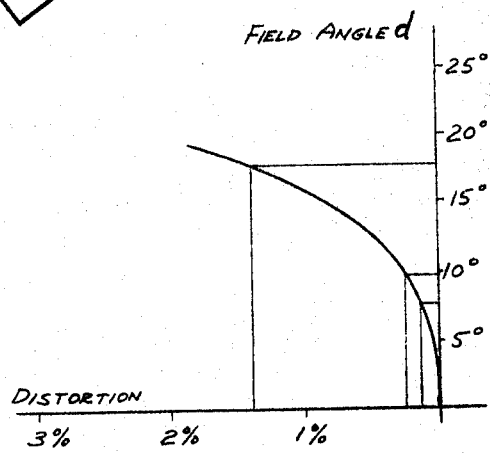
FIGURE 3a shows the distortion characteristics of a photographic so-called "landscape lens"
Figure 3B:
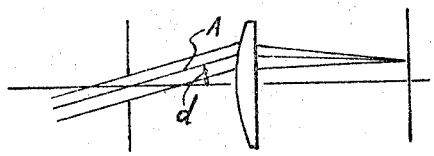
FIGURE 3b shows a bundle of light passing through an outer zone of an insufficiently corrected lens.

FIGURE 2 illustrates how this optical effect can be used to provide temperature compensation in a refractometer. The particular compensator shown in the figure employs an arrangement of aperture stop and lens that is often used in simple photographic cameras and known as a "landscape lens," with the position of the stop in front. This stop position flattens the tangential field and is desirable in refractometry. It also favors the correction of the "lateral color" error present in many refractometers as has already been explained in the parent application. FIGURE 3a shows the distortion characteristics of such a "landscape lens."

Reverting to FIGURE 2 and assuming that the angle included between light bundles 104 and 105 is 10 degrees, and that the tilt of lens 102 is such that the angles of incidence of these bundles are −25 and −15 degrees respectively, it is seen from FIGURE 3a that there is a subtantial negative distortion present in the system, resulting in an optical image several percent smaller than would be produced by the same lens in the tilted position shown in dotted outline, which would admit the same bundles 104 and 105 at angles of +5 and −5 degrees respectively. Therefore, if "a reverse welded" composite bimetal actuator 112 moved the lens counter-clockwise from the full line vertical position to the dotted line tilted position when the temperature drops, the incidence angle of bundle 105 would change from −15 to +5 degrees, reducing negative (barrel) distortion somewhat and raising point 109 to some extent. The incidence of bundle 104 will change from −25 to −5 degrees, however, which eliminates a great deal of negative distortion and causes point 108 to rise to a greater degree. This appears to the observer as a change of tangential magnification and produces the desired compensating effect.

It has been pointed out in the foregoing discussion that, in addition to causing changes of image size, temperature changes also displace the image. The compensator must hence include means for restoring the image position relative to the scale. This may be accomplished, for instance, by moving the scale in its own plane, or by making use of the fact that the optical image of a faraway object follows any displacement of the lens by which it is formed. Image displacement can hence be generated by moving the objective lens in a direction parallel to the scale, for instance, by adding a horizontally disposed bimetallic member 113, secured at one end to the bimetallic actuator 112, and at the other end to a stationary base 114. Flexivity, thickness, and length of actuator portion 113 must be chosen to generate the desired lateral displacement per degree temperature change.

As a numerical example, consider an uncompensated refractometer with an optical structure similar to that shown in FIGURE 2, having an objective of 57 mm. focal length, an included field angle between light bundles 108 and 109 of 10 degrees, corresponding to a distance of 10 mm. between image points 108 and 109. Assume that the initial orientation of objective 102 is normal to light beam 105, light beam 104 would then strike it at 10 degrees. If the temperature rose by 20 degrees F., image point 108 would drop by perhaps 0.25 mm. and image point 109 by 0.15 mm. The image size would thus decrease by .10 mm, or about 1 percent. It can be seen in FIGURE 3a that an image point 10 degrees off axis is subject to 0.25 percent distortion as compared to the axial point. If the lens were rotated by 8 degrees in a clockwise direction, the 10 degree bundle would become an 18 degree bundle, and the distortion would increase to 1.4 percent. The axial bundle would become an 8 degree bundle subject to 0.12 percent distortion. The net distortion suffered by the image would thus increase from 0.25 percent before rotation to (1.4−0.12)=1.28 percent after rotation. The shrinkage of image size would be (1.28−0.25)=1.0 percent as required.

An actuator tilting the lens by 8 degrees and raising it by 0.15 mm. for a 20 degree F. temperature change will, therefore, provide compensation over this temperature interval, at both the bottom and the top of the scale.

A bimetal strip or other actuator capable of generating 8 degrees rotation for a 20 degree F. temperature change would be large and perhaps too bulky for use in compact, portable instruments. Because of the third power relationship between distortion and angle of incidence already discussed, the required rate of rotation can be reduced greatly by increasing the angle of incidence to 60 or 70 degrees.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. In a refractometer comprising a measuring prism with an entrance face for receiving substances to be measured, said substances having indices of refraction different from one another, a reticle, an optical system between said entrance face and said reticle for projecting an optical image of light incident upon said system onto said reticle, the position and the size of said optical image on said reticle being a measure of the refractive indices of said substances, said optical system having a magnification determining the size of said optical image projected onto said reticle, and compensating means including an objective lens and temperature-sensitive means for varying the angular position of said objective lens with respect to the direction of said incident light to change said magnification and to change the position of said image in the plane of said reticle, both as a function of temperature changes, thereby compensating for the changes in said refractive indices with temperature and rendering said position and said size of said optical image in the plane of said reticle substantially independently of temperature.

2. A refractometer according to claim 1, wherein said temperature-sensitive means comprises a bimetallic member exposed to substantially the same temperature as the entrance face causing said member and said entrance face to be in substantial temperature equilibrium.

3. The invention according to claim 1, wherein said objective lens is initially oriented in an angular position with respect to the direction of said incident light.

References Cited by the Examiner
UNITED STATES PATENTS
2,934,992   5/1960   Goldberg _____ 88—14

FOREIGN PATENTS
1,240,397   7/1960   France.

JEWELL H. PEDERSEN, *Primary Examiner.*

JOHN K. CORBIN, *Examiner.*